US008993165B2

(12) United States Patent
Miller et al.

(10) Patent No.: US 8,993,165 B2
(45) Date of Patent: Mar. 31, 2015

(54) CLATHRATE ALLOTROPES FOR RECHARGEABLE BATTERIES

(71) Applicant: Southwest Research Institute, San Antonio, TX (US)

(72) Inventors: Michael A. Miller, San Antonio, TX (US); Kwai S. Chan, San Antonio, TX (US); Wuwei Liang, San Antonio, TX (US); Candace K. Chan, Phoenix, AZ (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 14/227,275

(22) Filed: Mar. 27, 2014

(65) Prior Publication Data
US 2014/0302391 A1 Oct. 9, 2014

Related U.S. Application Data

(62) Division of application No. 13/109,704, filed on May 17, 2011, now Pat. No. 8,722,247.

(51) Int. Cl.
| | |
|---|---|
| *H01M 4/13* | (2010.01) |
| *H01M 4/58* | (2010.01) |
| *B82Y 30/00* | (2011.01) |
| *H01B 1/02* | (2006.01) |
| *H01M 4/04* | (2006.01) |
| *H01M 4/134* | (2010.01) |
| *H01M 4/1395* | (2010.01) |
| *H01M 4/38* | (2006.01) |
| *H01M 10/0525* | (2010.01) |
| *H01M 4/02* | (2006.01) |

(52) U.S. Cl.
CPC . *B82Y 30/00* (2013.01); *H01B 1/02* (2013.01); *H01M 4/04* (2013.01); *H01M 4/134* (2013.01); *H01M 4/1395* (2013.01); *H01M 4/38* (2013.01); *H01M 4/386* (2013.01); *H01M 10/0525* (2013.01); *H01M 2004/021* (2013.01); *H01M 4/387* (2013.01); *Y02E 60/122* (2013.01)
USPC ..... 429/218.1; 429/209; 429/217; 252/520.1; 252/518.1; 252/182.1; 428/402; 204/280; 204/292

(58) Field of Classification Search
None
See application file for complete search history.

(56) References Cited

U.S. PATENT DOCUMENTS

| | | | |
|---|---|---|---|
| 5,800,794 A | 9/1998 | Tanigaki et al. | |
| 6,188,011 B1 * | 2/2001 | Nolas et al. | 136/236.1 |

(Continued)

FOREIGN PATENT DOCUMENTS

WO 2013158307 A1 10/2013

OTHER PUBLICATIONS

Imai, et al, "Synthesis of a Si-clathrate Compound, Sr8GaxSi46-8, and Its Electrical Resistivity Measurements"; Journal of Alloys and compounds 335, 2002, pp. 270-276.

(Continued)

*Primary Examiner* — Carlos Barcena
*Assistant Examiner* — Wojciech Haske
(74) *Attorney, Agent, or Firm* — Grossman, Tucker et al

(57) ABSTRACT

The present disclosure is directed at clathrate (Type I) allotropes of silicon, germanium and tin. In method form, the present disclosure is directed at methods for forming clathrate allotropes of silicon, germanium or tin which methods lead to the formation of empty cage structures suitable for use as electrodes in rechargeable type batteries.

9 Claims, 6 Drawing Sheets

(56) References Cited

U.S. PATENT DOCUMENTS

| | | | |
|---|---|---|---|
| 6,423,286 | B1 | 7/2002 | Gryko |
| 6,461,581 | B1 | 10/2002 | Eguchi et al. |
| 6,525,260 | B2 | 2/2003 | Yamashita et al. |
| 6,797,199 | B2 | 9/2004 | Eguchi et al. |
| 7,534,414 | B2 | 5/2009 | Nolas et al. |
| 8,722,247 | B2 | 5/2014 | Miller et al. |
| 2003/0197156 | A1 | 10/2003 | Eguchi et al. |
| 2008/0226836 | A1 | 9/2008 | Nolas et al. |
| 2011/0226299 | A1 | 9/2011 | Makansi |
| 2011/0253205 | A1 | 10/2011 | Grossman et al. |
| 2012/0021283 | A1 | 1/2012 | Chan et al. |
| 2012/0295160 | A1 | 11/2012 | Miller et al. |
| 2013/0280609 | A1 | 10/2013 | Chan et al. |

OTHER PUBLICATIONS

Tsujii, et al, "Phase Stability and Chemical Composition Dependence of the Thermoelectric Properties of the Type-I Clathrate Ba8AlxSi46-x ($8 \leq x \leq 15$)"; Journal of Solid State Chemistry 184, 2011, pp. 1293-1303.

Adams et al., Wide-band-gap Si in open fourfold-coordinated clathrate structures, The American Physical Society, Physical Review B, Mar. 15, 1994, pp. 8048-8053, vol. 49, No. 12.

Beattie et al., Si Electrodes for Li-Ion Batteries—A New Way to Look at an Old Problem, Journal of the Electrochemical Society, 2008, pp. A158-A163, vol. 155 (2).

Brooksbank et al., Tessellated Stresses Associated With Some Inclusions in Steel, Journal of the Iron and Steel Institute, Apr. 1969, pp. 474-483.

Chan et al., High-performance lithium battery anodes using silicon nanowires, nature nanotechnology—Letters, Jan. 2008, pp. 31-35, vol. 3.

Connetable et al., Superconductivity in Doped sp3 Semiconductors: The Case of the Clathrates, The American Physical Society—Physical Review Letters, Dec. 12, 2003, pp. 247001-1-247001-4, vol. 91, No. 24.

CPMD—Car-Parrinello Molecular Dynamics—Manual, An ab initio Electronic Structure and Molecular Dynamics Program, The CPMD consortium, Sep. 4, 2008, 258 pages.

Cui et al., Crystalline-Amorphous Core-Shell Silicon Nanowires for High Capacity and High Current Battery Electrodes, American Chemical Society—Nano Letters, Dec. 1, 2008, 5 pages.

Eom et al., Electrochemical Insertion of Lithium into Multiwalled Carbon Nanotube/Silicon Composites Produced by Ballmilling, Journal of the Electrochemical Society, 2006, pp. A1678-A1684, vol. 153 (9).

Graetz et al., Highly Reversible Lithium Storage in Nanostructured Silicon, Electrochemical and Solid-State Letters, 2003, A194-A197, vol. 6 (9).

Green et al., Structured Silicon Anodes for Lithium Battery Applications, Electrochemical and Solid-State Letters, 2003, A75-A79, vol. 6 (5).

Grovenstein, et al., "Cleavage of tetraalkylammonium halides by sodium in liquid ammonia" J. Am. Chem. Soc. 1959, 81, 4850-4857.

Huggins et al., Decrepitation Model for Capacity Loss During Cycling of Alloys in Rechargeable Electrochemical Systems, Ionics, 2000, 8 pages, vol. 6.

Kim et al., Three-Dimensional Porous Silicon Particles for Use in High-Performance Lithium Secondary Batteries, Angewandte Chemie—Anode Materials, 2008, pp. 10151-10154, vol. 47.

Lewis et al., In Situ AFM Measurements of the Expansion of Contraction of Amorphous Sn—Co—C Films Reacting with Lithium, Journal of the Electrochemical Society, 2007, pp. A213-A216, vol. 154 (3).

Manthiram, et al., "Low temperature synthesis of insertion oxides for lithium batteries." Chem. Mater. 1998, 10, 2895-2909.

Melinon et al., Phonon density of states of silicon clathrates: Characteristic width narrowing effect with respect to the diamond phase, The American Physical Society, Apr. 15, 1999, pp. 10 099-10 104, vol. 59, No. 15.

Miguel et al., A New Class of Low Compressibility Materials: Clathrates of Silicon and Related Materials, High Pressure Research, 2002, pp. 539-544, vol. 22.

Nakano, et al., "Soft xray photoelectron spectroscopy in silicon clathrate superconductors," SPring-8 Res Front 2001B/2002A, p. 51-53 (2003).

Ryu et al., Failure Modes of Silicon Powder Negative Electrode in Lithium Secondary Batteries, Electrochemical and Solid-State Letters, 2004, A306-A309, vol. 7 (10).

San-Miguel, et al., "High-pressure properties of group IV clathrates." High Pressure Research 2005, 25(3), 159-185.

Takamura et al., A vacuum deposited Si film having a Li extraction capacity over 2000 mAh/g with a long cycle life, Journal of Power Sources, 2004, pp. 96-100, vol. 129.

Timmons et al., In Situ Optical Observations of Particle Motion in Alloy Negative Electrodes for Li-Ion Batteries, Journal of the Electrochemical Society, 2006, pp. A1206-A1210, vol. 153 (6).

Timmons et al., Isotropic Volume Expansion of Particles of Amorphous Metallic Alloys in Composite Negative Electrodes for Li-Ion Batteries, Journal of the Electrochemical Society, 2007, pp. A444-A448, vol. 154 (5).

Wen et al., Chemical Diffusion in Intermediate Phases in the Lithium—Silicon System, Journal of Solid State Chemistry, 1981, pp. 271-278, vol. 37.

Yang et al., Small particle size multiphase Li-alloy anodes for lithium-ion-batteries, Solid State Ionics, 1996, pp. 281-287, vol. 90.

Yoshio, et al, "Lithium-Ion Batteries, Science and Technologies", 2009 Springer ISBN: 978-0-387-34444-7, e-ISBN: 978-0-387-34445-4, DOI: 10,1007/978-0-387-34445-4.

Zhang et al., Composite anode material of silicon/graphite/carbon nanotubes for Li-ion batteries, Electrochimica Acta, 2006, pp. 4994-5000, vol. 51.

Zhang et al., Pyrolytic carbon-coated silicon/Carbon Nanotube composites: promising application for Li-ion batteries, Int. J. Nanomanufacturing, 2008, pp. 4-15, vol. 2, Nos. 1/2.

International Search Report and Written Opinion of the ISA/KR (12 pgs); mail date Jun. 25, 2013; issued in related matter PCT/US2013/032430.

U.S. Office Action issued Mar. 19, 2013 in U.S. Appl. No. 12/842,224 (10 pgs).

U.S. Office Action issued Oct. 31, 2013 in U.S. Appl. No. 12/842,224 (12 pgs).

U.S. Office Action issued Jun. 26, 2013 in U.S. Appl. No. 13/109,704 (16 pgs).

U.S. Office Action issued Mar. 27, 2014 in U.S. Appl. No. 13/452,403 (15 pgs).

U.S. Office Action issued May 12, 2014 in U.S. Appl. No. 12/842,224 (13 pgs).

\* cited by examiner

CLATHRATE ALLOTROPES FOR RECHARGEABLE BATTERIES

CROSS REFERENCE TO RELATED APPLICATIONS

This application is a divisional of U.S. application Ser. No. 13/109,704, filed May 17, 2011, the teachings of which are incorporated herein by reference.

FIELD OF THE INVENTION

The present invention relates to cage structures of germanium and/or tin for use as an anode (negative electrode) and/or cathode (positive electrode) in rechargeable batteries. Such compositions may therefore provide electrode materials with improvement in capacity, energy density and stability over battery materials currently employed.

BACKGROUND

There is a need for new electrode materials with the capacity for lithium ions such that relatively higher energy densities can be realized. For example, work on improving graphite anodes in present-day batteries, which have a theoretical capacity of 372 mAh/g, and the current intercalcation cathode, such as $LiCoO_2$, has identified several potential candidates.

In that regard, attention is directed to U.S. application Ser. No. 12/842,224 entitled "Silicon Clathrate Anodes For Lithium Ion Batteries" which among other things, was directed at electrodes comprising cage structures such as silicon clathrate particles.

The present disclosure now identifies beneficial attributes and utility of clathrate (Type I) allotropes of germanium and tin for relatively high-capacity anode or cathode materials which may find particular use in lithium type batteries.

Lithium-ion batteries are a family of rechargeable battery types in which lithium ions move from a negative electrode to the positive electrode during discharge, and back when charging. More specifically, during discharge, lithium ions $Li^+$ carry current from the negative to the positive electrode through a non-aqueous electrolyte and separator diaphragm. The three primary functional components of the lithium-ion battery are therefore the anode, cathode and electrolyte.

Carbon or graphite has emerged as one of the most popular material for the anode. The cathode is generally one of three materials: a layered oxide (such as lithium cobalt oxide), a polyanion (such as lithium iron phosphate) or a spinel (such as magnesium oxide). Electrolytes may typically be selected from mixtures of organic carbonates such as ethylene carbonate or diethyl carbonate containing complexes of lithium ions.

Both the anode and cathode are therefore materials where the lithium may reversibly migrate. During insertion, lithium moves into the electrode. During extraction, lithium moves back out. The cathode half reaction may be written as:

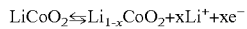

The anode half reaction may be written as:

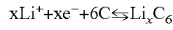

The overall reaction may be written as:

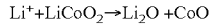

As noted above, there remains an ongoing need for higher specific capacity materials for higher energy density lithium-ion batteries. Work therefore continues on improving the carbon/graphite anode, which has a theoretical capacity of 372 mAh/g. However, the problems that are associated with finding a replacement material include identifying elements that, when participating in reversible reactions with lithium, do so in a manner that will not compromise anode performance.

SUMMARY

The present disclosure is directed at an electrode for a battery wherein the electrode comprises clathrate (Type I) allotropes of silicon, germanium and tin. The Type 1 clathrate structures may include an arrangement of silicon, germanium or tin as a 20-atom and 24-atom cage fused together through 5 atom pentagonal rings. The clathrate structures may be present as particles having a largest linear dimension of 0.1 μm to 100.00 μm.

In method form, the present disclosure is directed at a method for forming clathrate allotropes of silicon, germanium or tin comprising first supplying one of the following barium compounds: $BaSi_2$, $BaGe_2$ or $BaSn_2$ This may then be followed by exposing one of said compounds to a pressure at or above 3 GPa and to a temperature at or above 700° C. and forming one of the following barium-intercalated clathrate structures: $Ba_8Si_{46}$, $Ba_8Ge_{46}$, or $Ba_8Sn_{46}$. This may then be followed by removal of the barium from one of the clathrate structures.

In a still further exemplary embodiment, the present disclosure is directed at a method of forming a clathrate allotrope of silicon, germanium or tin comprising combining an ammonium halide or alkyl ammonium halide of the following structure

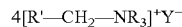

a negatively charged counter-ion comprising a silicide, germanide or stannide anion of the formula:

and forming a guest-free clathrate I structure represented by the formula:

wherein R' is an alkyl group or branched alkyl group, $R_3$ is a methyl group or hydrogen and $Y^-$ is a negative charged counter-ion and X=Si, Ge or Sn.

BRIEF DESCRIPTION OF THE DRAWINGS

The detailed description below may be better understood with reference to the accompanying figures which are provide for illustrative purposes and are not to be considered as limiting any aspect of the invention.

DETAILED DESCRIPTION

Cage structures, such as silicon germanium and/or tin clathrates, are disclosed herein as anode materials which may then be utilized in lithium-ion batteries. For example, the clathrates may be understood herein as $sp^3$ bonded silicon, germanium or tin atoms arranged in cage-structures. A cage structure is reference to a structure that may optionally trap and contain a second type of molecule.

Figure 1:
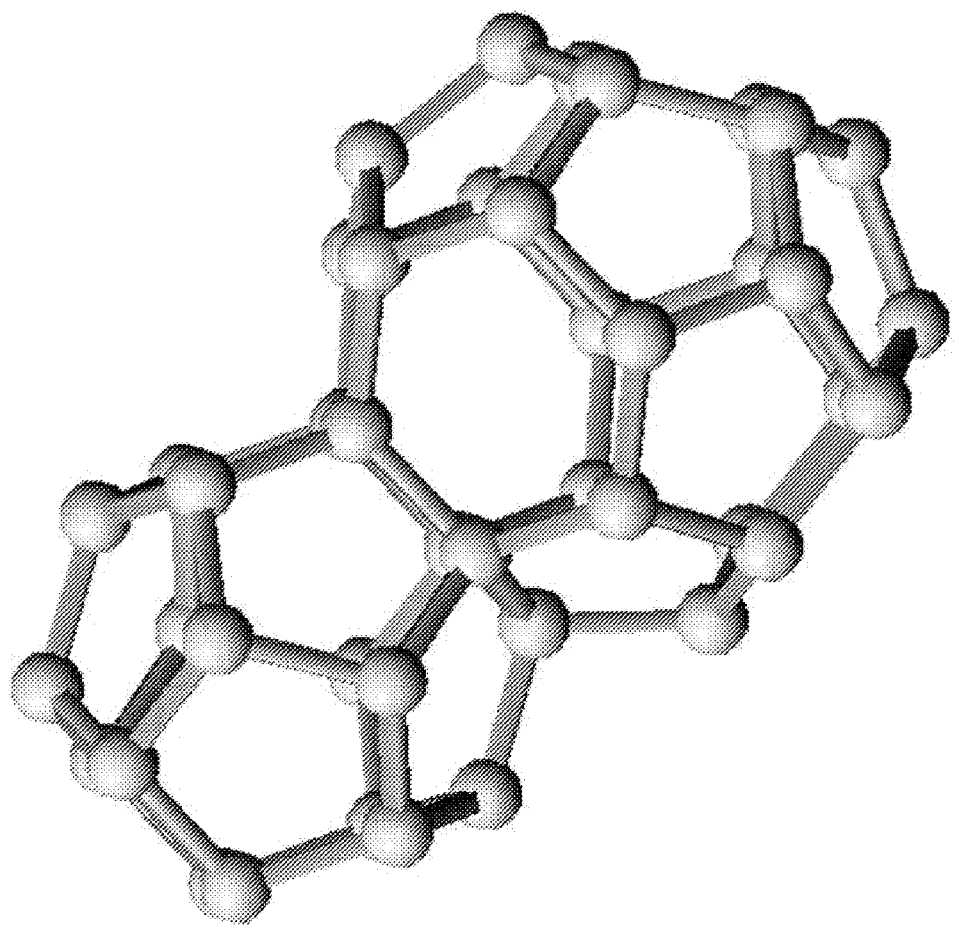
FIG. 1 illustrates $Si_{20}$ and $Si_{24}$ cages as the building of the representative $Si_{46}$ clathrate.
Figure 2:
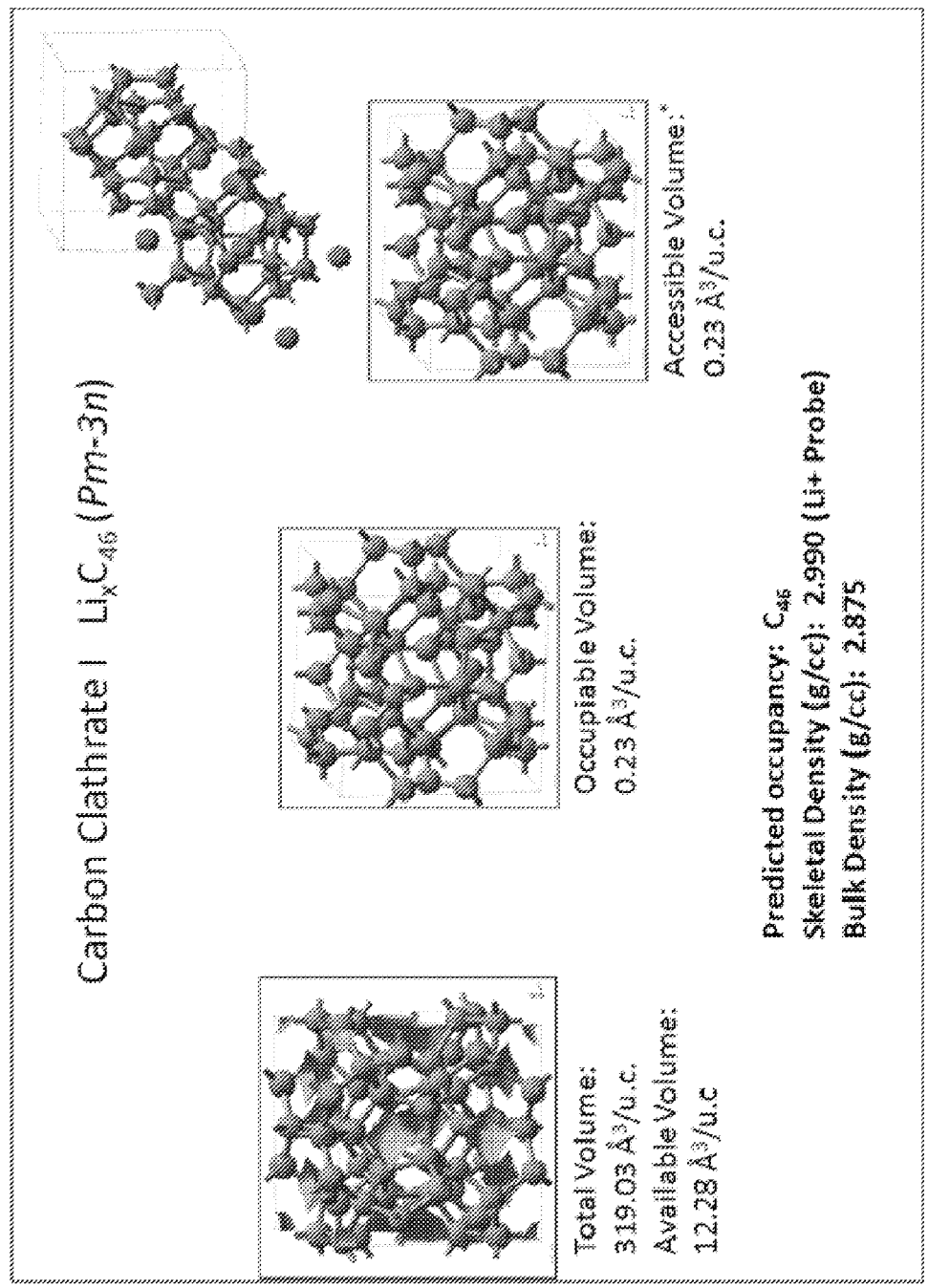
FIG. 2 illustrates unit cell structures and corresponding interstitial theoretical volumes for the clathrate allotrope of carbon. The available volume is represented by a van der Waals isosurface that is shaded.
Figure 3:
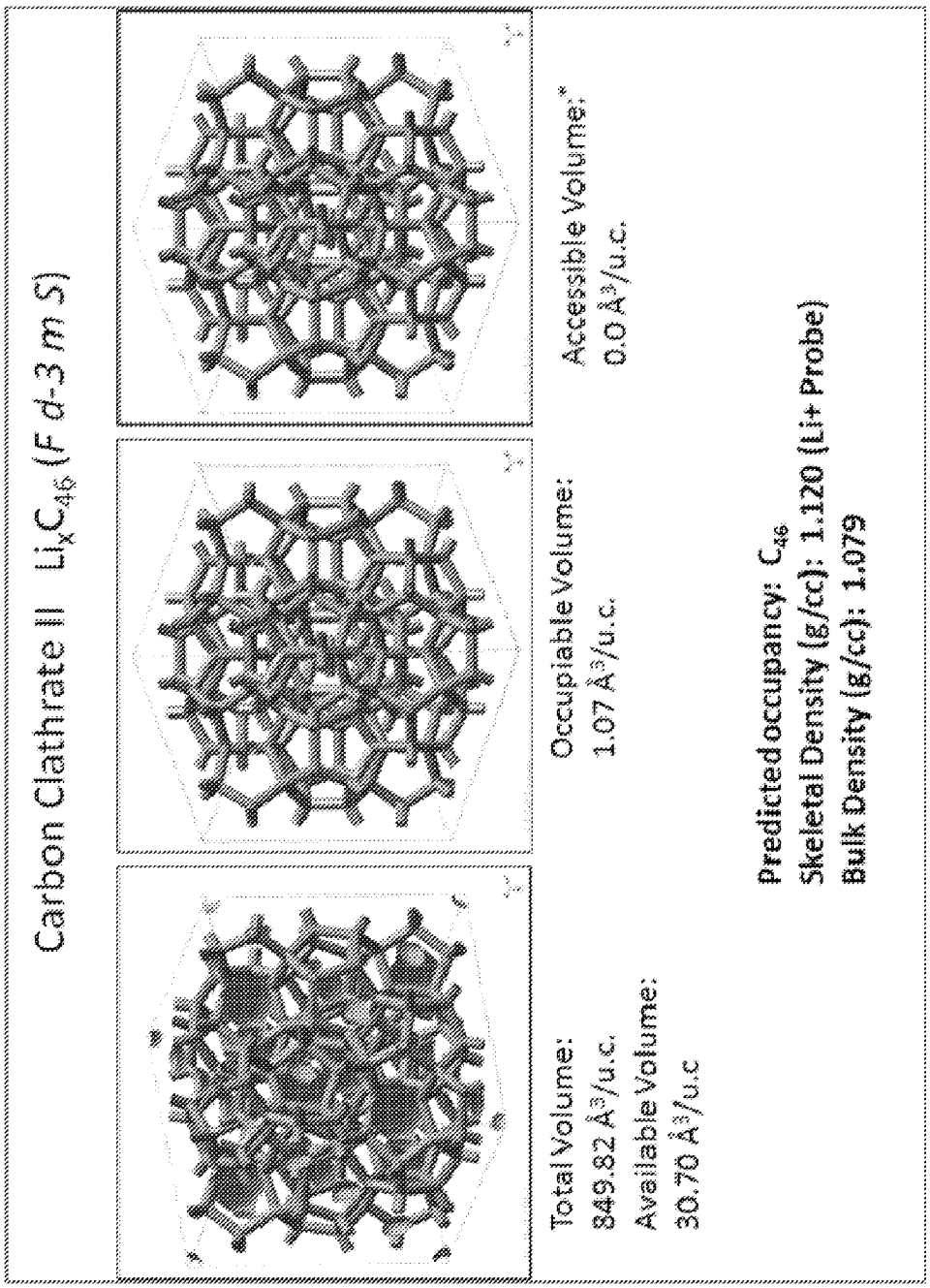
FIG. 3 illustrates the unit cell structures and corresponding interstitial theoretical volumes for the clathrate II allotropes of carbon. The available volume is represented by a van der Waals isosurface that is shaded.

For example, by way of representative discussion, Type I silicon clathrate $Si_{46}$ or Type I germanium clathrate or Type I tin clathrate comprises crystalline Si, Ge or Sn with a regular arrangement of 20-atom and 24-atom cages fused together through 5 atom pentagonal rings. Silicon clathrate $Si_{46}$ may be identified as $Si_{46}$ clathrate and may also be identified with the Pearson Symbol cP46. FIG. 1 is a representation of a face-sharing $Si_{20}$ and $Si_{24}$ cages as the building unit of the $Si_{46}$ clathrate. In addition, it should be noted that preferably, the silicon clathrate cage structures are such that they do not include doping atoms (e.g. atoms from group 1A, group 2A, group 3A, group 1B, group 2B, group 3B, group 4A, group 5A, group 6A and group 8) encapsulated within the clathrate lattice.

The representative $Si_{46}$ clathrate for use as the anode herein may be further described as having a simple cubic structure with a lattice parameter of 10.335 Å and 46 Si atoms per unit cell. The crystal structure of the $Si_{46}$ clathrate belongs to the Space group $Pm\bar{3}n$ and Space Group Number 223. The crystal structure of the silicon clathrate ($Si_{46}$) is different from the common form of crystalline Si (c-Si), which is diamond cubic with a lattice parameter of about 5.456 Å and belongs to the Space Group $Fd\bar{3}m$, Number 227.

Another representative form of clathrate contemplated for use herein as the anode is $Si_{34}$ (Type II clathrate) that contains crystalline Si with a regular arrangement of 20 atoms and 28 atom cages fused together through 5 atom pentagonal rings. The $Si_{34}$ clathrate has a face-centered cubic (fcc) structure, with 136 Si atoms per fcc unit cell. The $Si_{34}$ clathrate has a lattice parameter of 14.62 Å and belongs to the Space Group $Fd\bar{3}m$, Number 27. A third form of silicon clathrate is a modification of the $Si_{46}$ type formed by removing four atoms from the 24-atom cages.

Group IV clathrates include carbon, silicon, germanium, and tin with Type I, II, and III cage structures. Because the lithiation characteristics exhibited by Type I silicon clathrates have been demonstrated in U.S. application Ser. No. 12/842,224 to exhibit attractive properties, first-principles lithiation calculations are now disclosed herein for carbon, germanium, and tin clathrates. These calculations constitute one initial feature of the present disclosure, while synthetic routes to forming the indicated compositions of matter are also described herein.

The crystallographic and physical properties of the Group IV Type I clathrates are now presented in Table 1:

TABLE 1

Crystallographic Properties And The Calculated Volumes And Li+ Occupancies Of Group IV Clathrates

| Element | Clathrate | Type | Space Group | Lattice Constant, $a_0$ (Å) | Predicted Volumes (Å³/u.c.) Total Cell | Available | Occupiable | Accessible | Li+ Probe (Å³) | No. of Li+ |
|---|---|---|---|---|---|---|---|---|---|---|
| C | $C_{46}$ | I | $Pm\bar{3}n$ | 6.833 | 319.03 | 12.28 | 0.23 | 0 | 1.84 | 0 |
|   |   | II | $Fd\bar{3}m$ | 9.472 | 849.82 | 30.7 | 1.07 | 0 | 1.84 | 0 |
| Si | $Si_{46}$ | I | $Pm\bar{3}n$ | 10.355 | 1110.33 | 169.51 | 47.76 | 42.9 | 1.84 | 23 |
|   |   | II | $Fd\bar{3}m$ | 14.62 | 3124.94 | 429.94 | 119.56 | 4.35 | 1.84 | 2 |
| Ge | $Ge_{46}$ | I | $Pm\bar{3}n$ | 10.66 | 1211.36 | 699.01 | 312.13 | 312.13 | 1.84 | 169 |
| Sn | $Sn_{46}$ | I | $Pm\bar{3}n$ | 12.04 | 1745.34 | 433.7 | 165.81 | 146.26 | 1.84 | 79 |

Using these properties, computations of the total cell volume, available volume, occupiable volume, and accessible volume within the clathrate allotropes (Type I and Type II) and the common structures may now be used to compare the ability with which Li+ may be inserted into these structures. The occupiable and accessible volumes of crystal lattices were computed in which the radial distance between non-bonded interactions of a Li+ probe-sphere of ionic radius 0.76 Å and the atomic framework determine the number of probes (i.e., lithium ions) that can occupy the lattice empty volume. The available cell volume is further computed from the van der Waals isosurface and represents the total free volume of a lattice per unit cell (u.c.) independent of the probe interactions; i.e., the volume not occupied by atoms. The occupiable volume may be understood to reflect the total volume that may be occupied by the probe within the volume not already occupied by lattice atoms, whereas the accessible volume reflects the volume region accessible to the probe diffusing into the lattice from the exterior. In the latter case, some volume regions which were occupiable may become inaccessible if they cannot be physically reached by the probe from the outside. The available and occupiable volumes are larger for $Ge_{46}$ than the clathrate I structures of C, Si, and Sn because the van der Waals radius of Ge (1.39 Å) is smaller than that of C (1.7 Å), Si (2.1 Å), and Sn (2.17 Å).

Accordingly, in the broad context of the present disclosure the silicon, germanium or tin clathrate may be understood as a clathrate that, when configured into an electrode, and upon intercalcation of lithium, undergo a volume expansion of less than or equal to 50.0%, or in the range of 0.1% to 50.0% at 0.1% increments. In related context, the clathrate structures herein are such that upon deintercalcation, undergo a volume change (contraction) of 50.0% or less, or in the range of 0.1% to 50.0% at 0.1% increments.

To illustrate further in structural reference to the predicted lithium occupancies of the present disclosure, we refer to FIGS. 2-6. For Type I and II carbon clathrates (FIGS. 2 and 3), the occupiable and accessible volumes for Li⁺ may be assumed to be zero. The predicted occupancy is thus $C_{46}$, meaning that the insertion of Li⁺ into $C_{46}$ is not feasible for both Type I and Type II carbon clathrates.

Figure 4:
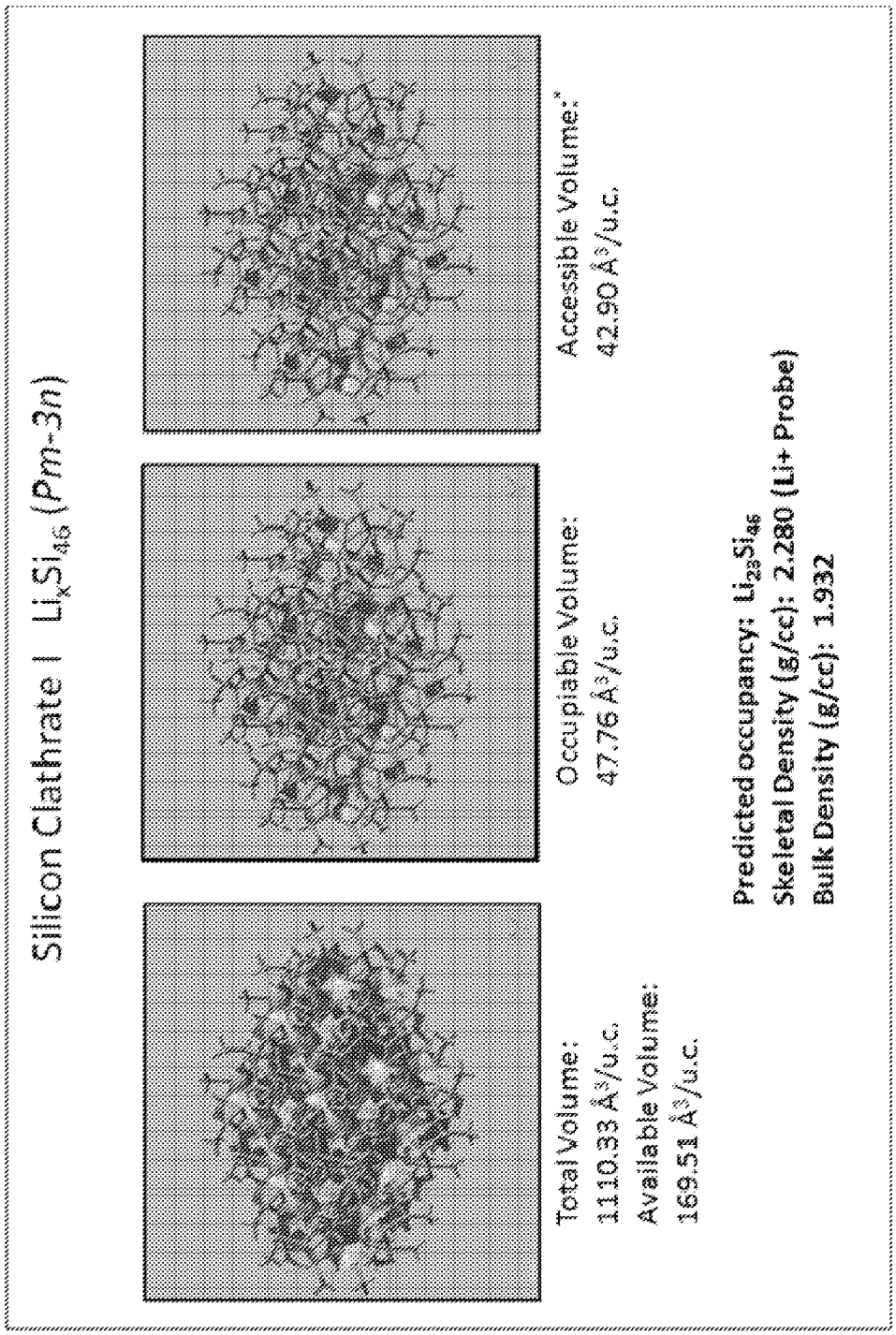
FIG. 4 illustrates the unit cell structures and corresponding interstitial theoretical volumes for clathrate I allotropes of silicon. The available volume is represented by a van der Waals isosurface that is shaded.
Figure 5:
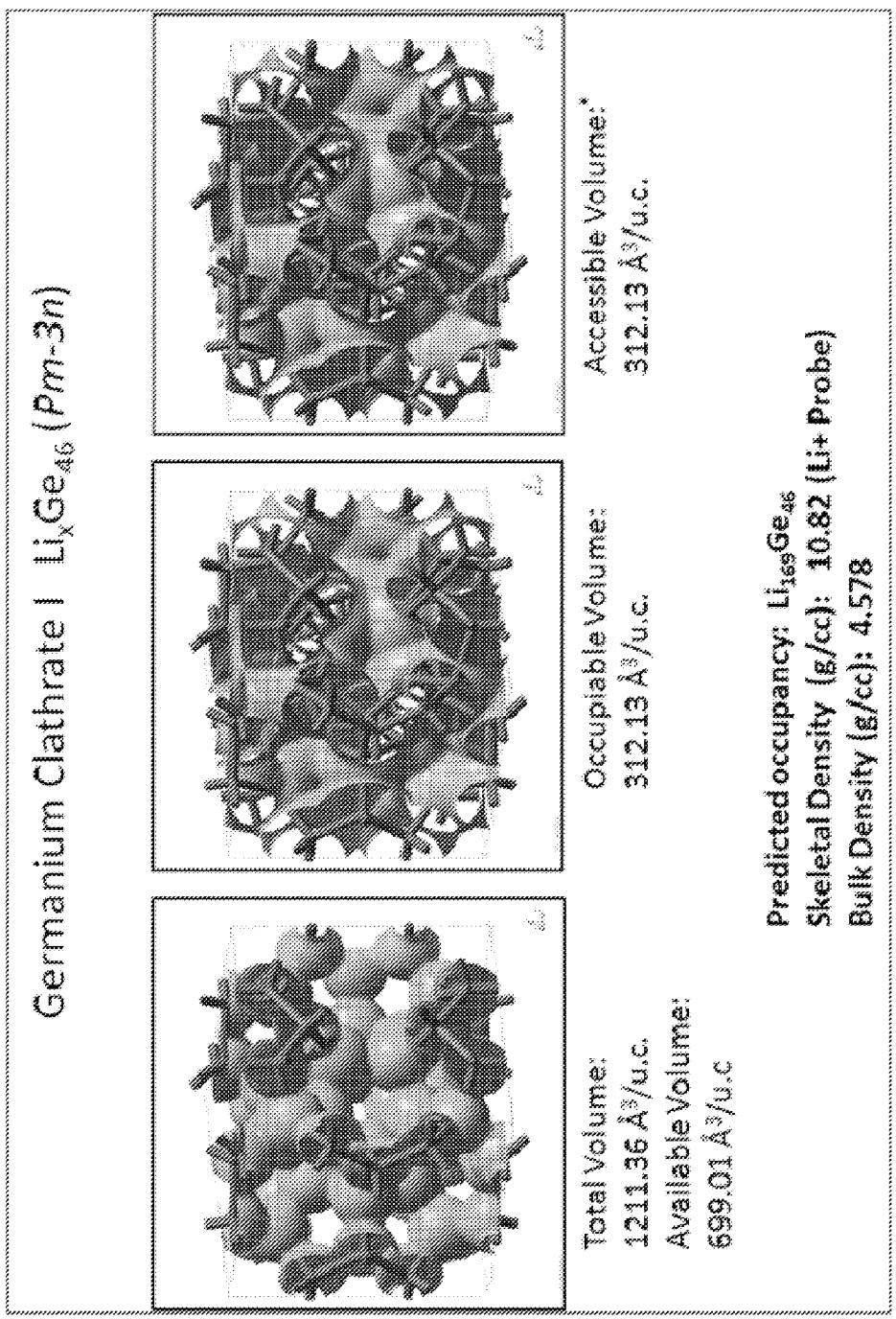
FIG. 5 illustrates the unit cell structures and corresponding interstitial theoretical volumes for clathrate I allotropes of germanium. The available volume is represented by a van der Waals isosurface that is shaded.
Figure 6:
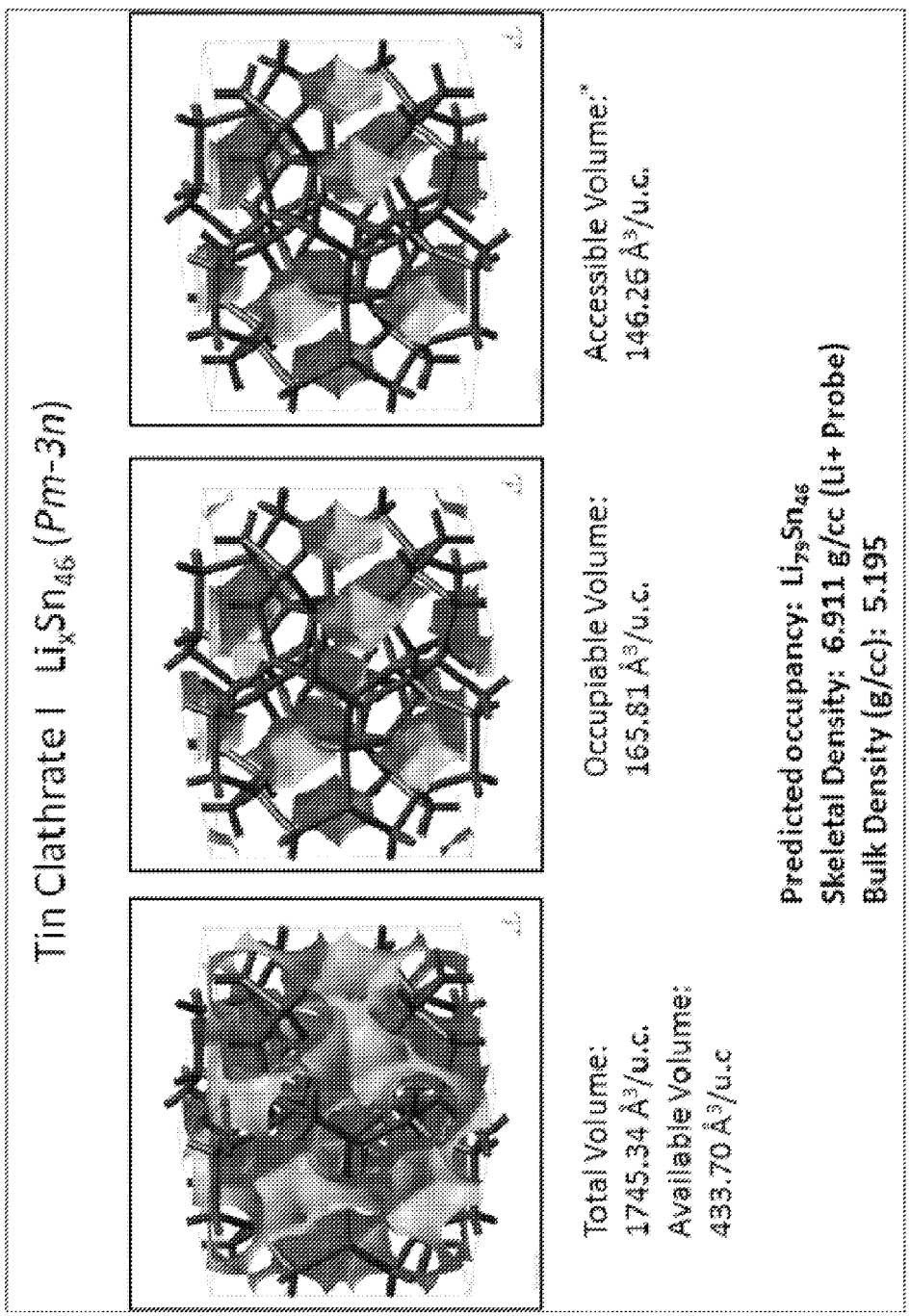
FIG. 6 illustrates the unit cell structures and corresponding interstitial theoretical volumes for clathrate I allotropes of tin. The available volume is represented by a van der Waals iso-surface that is shaded.

By contrast, the computational results for the clathrate I allotropes of silicon and germanium structurally illustrated in FIGS. 4 and 5 indicate that the occupiable and accessible volumes are 47.76 and 42.90 Å³/unit-cell for $Si_{46}$, respectively, while both the occupiable and accessible volumes are 312.13 Å³/unit-cell for $Ge_{46}$. This accessible volume of germanium clathrate by Li⁺ equates to a predicted occupancy of 169 ions, indicating adequate diffusion pathways for Li⁺ into and out of the structure. Thus, the lithiation of the clathrate I allotrope, $Ge_{46}$, results in the formation of $Li_{169}Ge_{46}$. By comparison, the accessible volume for Type I tin clathrate, shown in FIG. 6, is 146.26 Å³/unit-cell and a predicted occupancy of 79 Li⁺ atoms. Similar calculations are presented for the two clathrate allotropes of silicon in Table 1.

It may be further understood from the above-said calculations that the skeletal volume of the host structure is the total unit-cell volume minus the available unit-cell volume (accounting for the van der Waals radii of atoms in the atomic framework) which, when combined with the unit cell mass, can be used to compute the skeletal density of the host structure. Thus, one may now consider the use of the specific occupancy of each lithiated structure of matter as a parameter for comparing the effective capacities of any electrode material. The specific occupancy is defined herein as the predicted occupancy of Li⁺ divided by the number of host atoms per unit cell and divided again by the predicted skeletal density of the host structure. In addition to the said parameter, the specific gravimetric capacity, which is more commonly understood by those familiar in the art of battery technology, may be computed from $C_g=0.278nF/M$ (mA·h/g), where F is Faraday's constant (96,485.3415 C), n is the theoretical number of stored charges (Li⁺) per host atom, and M is the atomic mass of a host atom, h is hour and g is gram. These parameters are compared in Table 2 from the predicted occupancies of the lithiated structures. In each case, higher values correspond to better theoretical performance as a battery electrode.

TABLE 2

Characteristic Properties Calculated For Lithiated Clathrates Of Group IV Elements

| Lithiated Clathrate | Type | Host Bulk Density (g/cc) | Host Skeletal Density (g/cc) | Specific Occupancy (atom · cc/g) | Specific Gravimetric Capacity (mA · h/g) |
|---|---|---|---|---|---|
| $Li_{23}Si_{46}$ | I | 1.932 | 2.280 | 0.219 | 478 |
| $Li_2Si_{46}$ | II | 0.686 | 0.796 | 0.055 | 41.5 |
| $Li_{169}Ge_{46}$ | I | 4.578 | 10.820 | 0.340 | 1357 |
| $Li_{79}Sn_{46}$ | I | 5.195 | 6.911 | 0.248 | 388 |

The present disclosure now describes the synthesis of the clathrate I allotropes of silicon, germanium and tin. These synthetic schemes should be understood as exemplary in nature and the preparation of the indicated structures should not be viewed as limiting.

High Energy Synthesis

High energy synthesis described herein refers to the allotropic transformation of an initial structure to the desired one via a relatively high-pressure mechanical compression of a solid substance at elevated temperature. Accordingly, one may employ pressures at or above 3 GPa and at temperatures at or above 700° C., or more preferably pressures in the range of 3 GPa to 6 GPa and temperatures in the range of 700° C. to 1000° C. Preferably, a Walker-type multi-anvil system is used in combination with an h-BN (hexagonal boron nitride) cell and carbon heater to symmetrically compress $BaSi_2$, $BaGe_2$, or $BaSn_2$ to pressures exceeding 3 GPa and temperatures exceeding 700° C., thus facilitating the structural transformation of the silicide, germanide, or stannide to the barium-intercalated clathrate I structures, respectively: $Ba_8Si_{46}$, $Ba_8Ge_{46}$, and $Ba_8Sn_{46}$. This method is capable of producing isomorphous material as determined by crystallographic techniques such as powder X-ray crystallography. The general equations that summarize the above may therefore be written as follows:

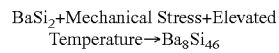

BaSi₂+Mechanical Stress+Elevated Temperature→Ba₈Si₄₆

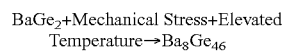

BaGe₂+Mechanical Stress+Elevated Temperature→Ba₈Ge₄₆

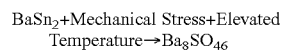

BaSn₂+Mechanical Stress+Elevated Temperature→Ba₈SO₄₆

It is further noted that the choice of the barium compounds as starting materials is preferred in order to better enable relatively large-scale syntheses of the preferred clathrate I structures due to their improved chemical stability over, for example, the sodium compounds of silicide, germanide, and stannide (all of the common diamond allotrope). This enhanced stability over the sodium compounds may particularly facilitate relatively safe handling of the barium compounds thereby reducing the risk of ignition upon exposure to air or moisture or contamination due to oxidation (or both).

Following synthesis of the said barium clathrate I compounds as noted above, the removal of barium atoms from the host structure to yield the empty clathrate may preferably proceed by one of two methods.

1. Sublimation-Condensation

A barium clathrate I compound is placed in an h-BN vacuum vessel coupled to a carbon heater and a cryosorption pump. The sample is heated 600-800° C. under high vacuum (~10⁻⁶ Torr) for several hours. Under these conditions, enclathrated barium is sublimed and then condensed as Ba metal onto the molecular sieve material of the cryosorption pump away from the sample. The empty clathrate sample is then allowed to cool slowly at a rate of 1 K/min.

2. Electrochemical Deintercalation

An electrochemical cell may be constructed for bulk electrochemical deintercalation of $Ba^{2+}$ from the host clathrate and cathodic reduction to Ba metal onto a cathode electrode. In this apparatus, an anode is formed by compressing a barium clathrate sample into the form of a pellet or film in contact with an electrically conducting electrode. The cathode of this cell is formed from an electrically conducting, inert metal, which includes but is not limited to a foil, a rigid plate, or a screen. Both the anode and cathode are immersed in a non-aqueous electrolytic solution, such as an ionic liquid (e.g., 1-butyl-3-methylimidazolium hexafluorophosphate) or, for example, tetrabutylammonium hexafluorophosphate (TBAHFP) in acetonitrile. Using a potentiostat or galvanostat apparatus, $Ba^{2+}$ is deintercalated from the host clathrate under anodic electrochemical conditions and is reduced as Ba metal at the cathode.

Direct Synthesis via Hofmann-Type Reaction

Direct synthesis of guest-free clathrate I structures of silicon, germanium, and tin may also be achieved as a batch heterogeneous reaction in solution. Referring to Scheme I below, controlled oxidation of the silicide, germanide, or stannide anion ($X_9^{4-}$; X=Si, Ge, Sn) from the barium (diamond) compounds as noted above may be undertaken using a weakly acidic ammonium halide or alkyl ammonium halide, via the Hofmann elimination reaction to yield the guest-free clathrate I structures and the indicated byproducts. This heterogeneous reaction may be further carried out at elevated temperature (~300° C.) in a high boiling point ionic liquid (e.g., 1-butyl-3-methylimidazolium hexafluorophosphate) as the reaction solvent. The solid clathrates may then be separated from the reaction solution via filtration and subsequently intercalated with lithium ions under electrochemical conditions.

SCHEME I

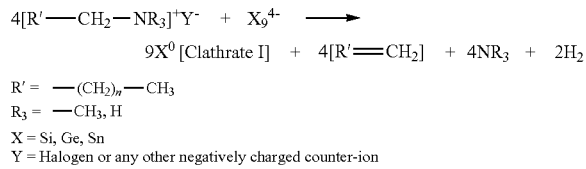

$4[R'-CH_2-NR_3]^+Y^- + X_9^{4-} \longrightarrow$ $9X^0 [Clathrate\ I] + 4[R'=CH_2] + 4NR_3 + 2H_2$ $R' = -(CH_2)_n-CH_3$
$R_3 = -CH_3, H$
$X = Si, Ge, Sn$
$Y = Halogen\ or\ any\ other\ negatively\ charged\ counter-ion$ In the above it should be noted that with respect to R', it may generally amount to any alkyl and/or branched alkyl, and preferably, the value of n in $R'=-(CH_2)_n-CH_3$ may be on the order of 1-50. In addition, when bonded to the indicated methylene group, the bonding may proceed through a methine (—CH=) type linkage.

Pulsed Laser Synthesis

Ultrafast pulsed-laser ablation may also be preferably used to directly synthesize guest-free clathrate I structures of silicon, germanium, and tin. The technique preferably utilizes relatively high-intensity picosecond-duration and monochromatic laser pulses delivered onto a target (silicon, germanium, or tin) at rates of several tens of MHz. For example, one may expose silicon, germanium or tin to a laser pulse for a duration in the range of 1 fs (femtosecond) to 1 us (microsecond). Using those wavelengths in resonance with the photoexcitation manifolds or ionization energies of electrons in the target material, such processes may be used advantageously to cause bonds to break and material to vaporize with concurrent shock wave generation (photoablative effect). A relatively small plasma plume may then be formed near the target surface which undergoes adiabatic cooling at a relatively high rate. The local temperatures and pressures generated at the target are relatively high. By reducing the laser pulse energy while maintaining optimum evaporation, the number of atoms ionized and evaporated by each pulse is relatively small without causing ejections of large lumps of materials from the target.

It may be understood that the above-described pulsed-laser ablation technique may be used with a single laser excitation source or in combination with additional pulsed-laser or continuous wave (CW) sources of different wavelengths as the primary excitation source. For example, the primary excitation source may generate an intense pulsed beam with a wavelength in the UV (e.g., 248 nm), while a second pulsed-laser excitation source operating at a near infrared (NIR) wavelength (e.g., 1065 nm) is directed at the UV-generated plasma plume. Secondary excitation of the UV-generated plasma plume by the NIR laser may be used advantageously to further control the ionization state of the plasma plume and its adiabatic cooling rate, leading to the desired allotropic transformation of the target material.

Another modification to the above technique and apparatus may include heating of the target material at elevated temperatures while irradiating it with a primary pulsed-laser source. This may be accomplished either by employing resistive elements in contact with the target material or via a CW laser at NIR or infrared wavelengths directed at the target material.

As noted above, the cage structures such as the silicon, germanium or tin clathrates described herein, may be supplied in particulate form with varying geometry (spherical, cylindrical, plate-like, etc.). The size of any particulate form may be such that the largest linear dimension is less than or equal to 100.0 µm. Preferably, for cylindrical particles the size may therefore be less than or equal to 100.0 µm, or fall within the range of 0.1 µm to 100.0 µm. For thin-film geometries, it is preferably that the largest linear dimension is less than or equal to 50 µm, e.g., in the range of 0.1-50.0 µm.

The particulate cage structure may then be combined with a polymeric binder and optionally a conductive additive such as carbon black. Suitable polymeric binders for the anode herein may include polymeric materials such as poly(vinylidine fluoride and carboxymethylcellulose (CMC). The level of particulate cage structure in such binder, such as the $Si_{46}$ clathrate, may be at a level up to 95.0% by weight. Accordingly, the cage structure in the binder may be at a level of 50.0% -95.0% by weight in any 1.0% increment. The electrically conductive additives which may promote electrical conductivity of the electrode herein may include, e.g., carbon black, carbon nanotubes, conductive nanofibers, graphite, graphene, etc. The conductive additives may be present at a level of up to 20.0% by weight. Accordingly, the conductive additives may be present at a level of 1.0%-20.0% by weight in increments of 0.1%.

The particulate cage structure, polymer binder and optional conductive additive may be formed into a liquid or high viscosity paste form, optionally in the present of a solvent and then allowed to dry on a given conductive substrate to form an anode type electrode. The substrate may then be attached to (or make up) the current collector in a typical Li-ion battery. The materials for the substrate may therefore include, but are not limited to, stainless steel, copper, nickel, aluminum and other materials that are inert to lithium. The current collector can also comprise flexible materials such as elastomeric polymeric resins (e.g. polymeric materials that have an elongation of greater than 100% and which are then capable of recovering 75% or more of such elongation). Such elastomeric materials may be coated with a layer of metal, such as those noted above, in order to provide a requisite amount of electrical conductive capability for use within, e.g., a lithium-ion battery.

The cathode electrode herein may contain an electrode composed of powder composite materials that are typically employed in a Li-ion battery. Such material may therefore include $LiCoO_2$, $LiFePO_4$, $LiMnO_2$, $LiMn_2O_4$, and $LiNiO_2$. Between the two electrodes is an ionically conducting and electrically insulating electrolyte that facilitates transport of ions between the electrodes. This region preferably includes a membrane separator soaked with electrolyte. The electrolyte may preferably be a Li salt dissolved in an organic solvent. For example, the electrolyte may include 1M $LiPF_6$ in a 1:1 w/w ethylene carbonate/diethyl carbonate solvent. The electrolyte may also be a Li salt mixed with a solid ionically conducting material such as an electrically conductive polymer or inorganic type material.

The anode electrodes noted herein that are produced from the silicon, germanium and/or tin cage structures may be formed in relatively thin films for a Li and/or Li-ion battery. In such a configuration a film of the clathrate structure may be deposited on the metal substrate which as noted, serves as the current collector. The thickness of such film may be less than or equal to 50.0 μm in thickness, such as in the range of 0.1-50.0 μm in thickness. A solid electrolyte may then be positioned on top of the clathrate anode and a cathode layer may be subsequently deposited on top of the solid electrolyte to form a Li or Li-ion battery cell. The electrolyte may include but not be limited to inorganic electrolytes such as LiPON. The cathode material, as noted herein, includes but is not limited to $LiCoO_2$, $LiFePO_4$, $LiMnO_2$, $LiMn_2O_4$, and $LiNiO_2$.

What is claimed is:

1. An electrode for a battery wherein said electrode comprises tin clathrate at a particle size having a largest linear dimension of 0.1 μm to 100.0 μm and said electrode comprises a metal substrate and said tin clathrate is present on the surface of said metal substrate at a thickness of 0.1 μm to 50.0μm.

2. The electrode of claim 1 wherein said tin clathrate comprises tin clathrate $Sn_{46}$ containing an arrangement of 20 atom and 24 atom cages fused together through 5 atom pentagonal rings.

3. The electrode of claim 1 wherein said tin clathrate comprises particles having a spherical geometry having a largest linear dimension of 0.1 μm to 100.0 μm.

4. The electrode of claim 1 wherein said tin clathrate has one or more of the following: (1) an available volume of up to 433.7 $Å^3$ per unit crystal; (2) an occupiable volume of up to 165.81 $Å^3$ per unit crystal; (3) an accessible volume of up to 146.26 $Å^3$ per unit crystal; (4) a specific gravimetric capacity of up to 388 (mA·h/g).

5. The electrode of claim 1 wherein lithiation of said tin clathrate to form the lithiated clathrate compound $Li_{79}Sn_{46}$ results in a volume expansion of less than or equal to 50.0%.

6. The electrode of claim 1 wherein said tin clathrate is combined with a polymeric binder wherein said tin clathrate is present in said binder at a level of 50.0 - 95.0% by weight.

7. The electrode of claim 1 including n electrically conductive additive.

8. The electrode of claim 1 wherein said electrode comprises an anode electrode in a Li battery.

9. The electrode of claim 1 wherein said electrode comprises an anode electrode in a Li-ion battery.

* * * * *